United States Patent
Wang

(10) Patent No.: US 7,912,307 B2
(45) Date of Patent: Mar. 22, 2011

(54) DECONVOLUTION METHOD USING NEIGHBORING-PIXEL-OPTICAL-TRANSFER-FUNCTION IN FOURIER DOMAIN

(76) Inventor: Yu Wang, La Crescenta, CA (US)

( * ) Notice: Subject to any disclaimer, the term of this patent is extended or adjusted under 35 U.S.C. 154(b) by 922 days.

(21) Appl. No.: 11/821,063

(22) Filed: Jun. 22, 2007

(65) Prior Publication Data

US 2008/0193034 A1 Aug. 14, 2008

Related U.S. Application Data

(60) Provisional application No. 60/900,132, filed on Feb. 8, 2007.

(51) Int. Cl.
*G06K 9/40* (2006.01)
*G06K 9/36* (2006.01)
*G06K 9/32* (2006.01)

(52) U.S. Cl. .................. 382/254; 382/280; 382/299

(58) Field of Classification Search .................. 382/254, 382/263, 266–270, 274–280, 284, 299, 300, 382/305, 312; 358/1.2, 516, 518, 532, 3.26, 358/3.27; 345/615; 348/241, 521, 532, 533, 348/606, 671, 687
See application file for complete search history.

(56) References Cited

U.S. PATENT DOCUMENTS

| | | | | |
|---|---|---|---|---|
| 6,154,574 | A * | 11/2000 | Paik et al. | 382/255 |
| 7,321,699 | B2 * | 1/2008 | Johnson et al. | 382/254 |
| 7,602,997 | B2 * | 10/2009 | Young | 382/299 |
| 7,605,353 | B2 * | 10/2009 | Greenberg | 250/201.2 |
| 7,683,950 | B2 * | 3/2010 | Kelly et al. | 348/252 |

\* cited by examiner

*Primary Examiner* — Kanji Patel

(57) ABSTRACT

The present disclosure includes an image processing technique that is capable to increase spatial resolution of single frame images beyond diffraction limit. If an image is taken by diffraction limited optical system with regularly spaced pixel detectors, and if the spacing of pixels of the detectors is much small than the diffraction pattern, then the spatial resolution of the image can be increased beyond the diffraction limit by using neighboring-pixel-optical-transfer-function (NPOTF) in Fourier Domain with periodical boundary conditions.

19 Claims, 9 Drawing Sheets

DECONVOLUTION METHOD USING NEIGHBORING-PIXEL-OPTICAL-TRANSFER-FUNCTION IN FOURIER DOMAIN

This application claims the benefit of U.S. Provisional Application No. 60/900,132, filed Feb. 8, 2007.

FIELD OF THE INVENTION

The present invention relates to optical devices, and more specifically to optical imaging sensors and image processing techniques in order to increase spatial resolution of images.

BACKGROUND OF THE INVENTION

For an optical system, if it is free from optical aberrations, then its spatial resolution is limited by optical diffraction. Optical diffraction is well known phenomenon. When light passes through an aperture, the light spreads out so that a point light sources becomes a pattern of light across the director known as diffraction pattern. Diffraction pattern depends on size and shape of the optical aperture. For example, a circular aperture generates a diffraction pattern known as Airy disc, which has a bright central spot, surrounded by fainter bright and dark rings. These rings gradually fade as the diameter increases. When the center bright spot of the Airy disc becomes large relative to the pixel spacing of detector, the image looks burr. If two Airy disks become closer than half their width, the two spots are no longer resolvable (Rayleigh criterion). An optical system with the ability to produce images with angular separations as small as the instrument's theoretical limit is called diffraction limited.

A basic limitation of any optical systems is the aperture size. High resolution optical systems require very larger apertures. In many situations the large aperture optical systems are very costly, especially for space based optical systems.

Deconvolution is specifically used to refer to the process of reversing the optical distortion that takes place in an optical imaging instrument, and creating sharper images. Deconvolution is usually done by software algorithm. Generally speaking, if a point spread function (PSF) can be found, we can compute its inverse function, and restore the original, undistorted image. But in practice, the inverse of the PSFs may become infinite in some areas, and the noise level may become unacceptable. The Optical Transfer Function (OTF) describes the spatial (angular) variation as a function of spatial (angular) frequency. The OTF is the Fourier transform of the PSF.

It is desirable for obtain high resolution images with small aperture optical systems. There are a few imaging techniques can claim to increase image resolution beyond diffraction limit. Super-resolution (SR) is one technique that in some way can enhance the resolution of an imaging system. There are some SR techniques that process images in the frequency domain, by assuming that the object on the image is an analytic function, and that we can exactly know the function values in some interval. SR method needs multi-frame images and is limited by the noise that is present in digital imaging systems.

SUMMARY OF THE INVENTION

The invention provides a deconvolution method to increase resolution of single frame images taken by diffraction limited optical systems. If point spread function (PSF) of an optical system is considered uniform over focal plane of a regularly spaced pixel detector, and if the spacing of the pixels is much smaller than the PSF pattern, then the image resolution can be enhanced beyond diffraction limit after being processed by the present invention.

The present invention, deconvolution method using neighboring-pixel-phase-modulation-function in Fourier domain, includes the following steps: (a) calculating initial neighboring-pixel correlation coefficients (NPCCs) using point spread function (PSF) for an input image, (b) applying discrete Fourier transform (FT) to the input image, (c) build a neighboring-pixel-optical-transfer-function (NPOTF) using NPCCs and periodical boundary conditions, (d) applying the NPOTF to the Fourier components, and generating modified new Fourier components, and (e) applying inversed discrete FT to these new Fourier components, and a new, higher resolution image is generated.

BRIEF DESCRIPTION OF THE DRAWINGS

FIG. 1-(b) illustrates a typical two dimension angular light distribution of diffraction pattern from a circular aperture.

FIG. 6-(b) is an illustration of two 1D point objects separated by a small angular span.

FIG. 6-(c) is a modeling result of the image of the two objects though the 1-D optical aperture, the two objects become undistinguishable.

FIG. 6-(d) is a modeling result of the image 6-(c) after processed using the present invention, the two objects are clearly separated from each other.

FIG. 7-(b) is an illustration of two 2D point objects separated by a small angular span.

FIG. 7-(c) is a modeling result of the image of the two objects after the 2-D optical aperture, the two objects become undistinguishable.

FIG. 7-(d) is a modeling result of the image 7-(c) after processed by the present invention, the two objects are clearly separated from each other.

FIG. 8-(a) is a 3-D diagram illustrating the light intensity distribution of FIG. 7-(d), the two objects are clearly separated from each other after processed by the present invention.

FIG. 9-(b) is the processed image of FIG. 9-(a) using the present invention, the image becomes much sharper.

FIG. 10-(*b*) is the processed image of FIG. 10-(*a*) using the present invention, some new stars and new features are unveiled.

DETAILED DESCRIPTION OF THE PREFERRED EMBODIMENT

The present invention is an image processing method that is able to achieve image resolutions beyond the diffraction limit. The method employs deconvolution method using neighboring-pixel-optical-transfer-function (NPOTF) in Fourier domain.

Figure 1:
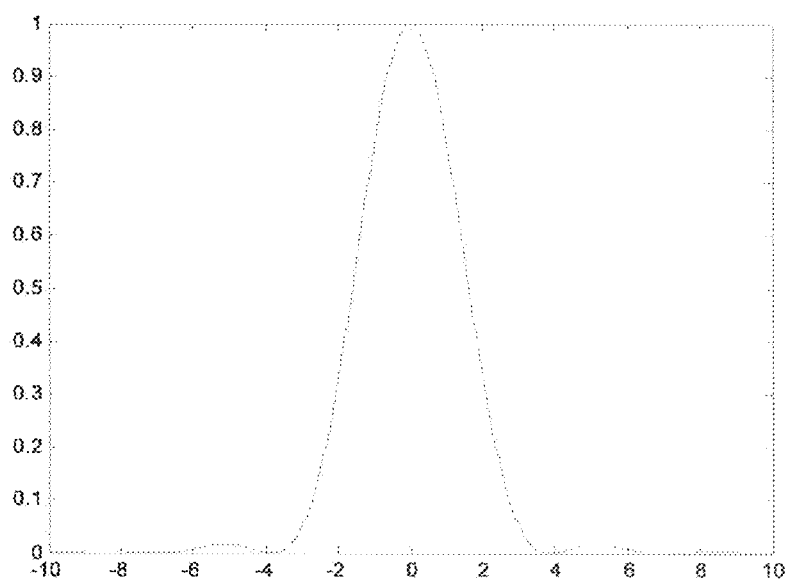
FIG. 1-(a) is plot of a typical angular light distribution of diffraction pattern from a circular aperture.
Figure 1:
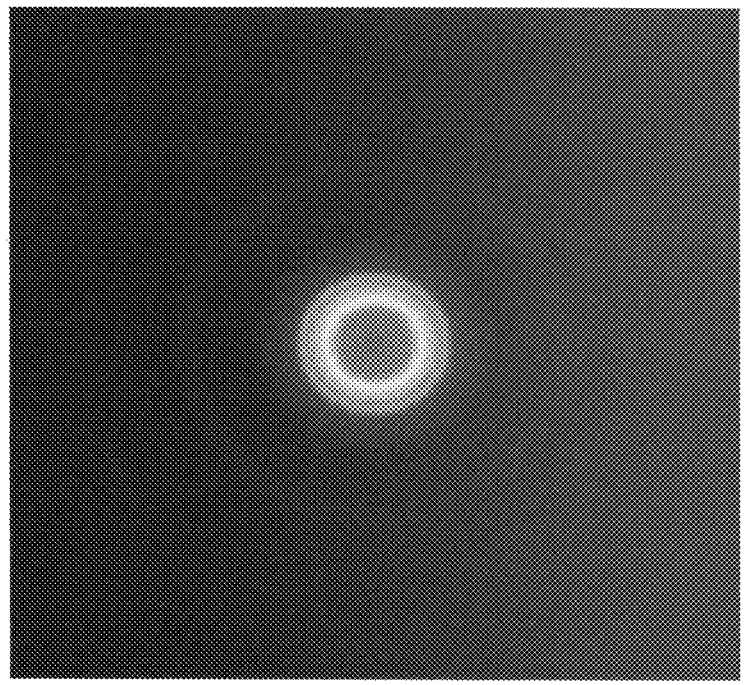

Resolution of any recorded image is limited by point spread function (PSF) associated with the instrument taking the image. For example, the image of a point light source through a circular aperture has an angular distribution of Airy disc on the recording detector as show in FIG. 1. FIG. 1-(*a*) is plot of angular light distribution of diffraction pattern of a typical circular aperture, and FIG. 1-(*b*) illustrates two dimension angular light distribution of diffraction pattern of a typical circular aperture.

An image on a detector can be expressed as a convolution of the original image with the PSF as:

$$I^d(x) = t(x)I^0(x) + n(x) \quad (1)$$

where $I^0(x)$ and $I^d(x)$ are the original and observed light distributions, $t(x)$ is the total PSF, and $n(x)$ are the measurement errors. For a perfect optical instrument, $n(x)=0$, and $t(x)$ is the diffraction function.

Resolution of an imaging instrument is limited by diffraction of its aperture. For photographic film imaging, because the photosensitive grains have irregular sizes and shapes, the diffraction limit barrier is impossible to overcome. Now CCD and CMOS image sensors have replaced films in most of the imaging instruments. All of the pixels in a CCD or a CMOS have the same size and spacing, this property provides us an opportunity to enhance an image resolution higher then the diffraction limit, simply by computing.

When a solid state light detector, for example a CCD, is used, the light is sampled at regularly spaced pixels. For a perfect instrument, the equation (1) becomes $$I_k^d = \sum_{j=1}^{N_t} t_{jk} I_j^0 \quad (2)$$

Where $N_t$ is the total number of pixels, $I_k^d$, $I_j^0$ are the vector components of $I^d(x)$, $I^0(x)$, and $t_{jk}$ is the value of point j of the PSF centered on point k. From eq. (2), we can see that if we can calculate the inverse matrix of $\{t_{jk}\}$, then the original image can recovered. But the calculation is almost impossible, because the inverse matrix is difficult to calculate or not even exists.

The present invention, deconvolution method using NPOTF in Fourier domain, employs neighboring-pixel model to generate a NPOTF. The NPOTF can generate a one-to-one relation between the Fourier components of the original image and the Fourier components of the detected image. Therefore the present invention is able to increase image resolution, even beyond the diffraction limit.

For many imaging systems, the apertures are circular and PSF is symmetric. If the field of view is small, PSF can be considered almost the same all over the detector focal plane. Because of diffraction, each pixel of the detector not only collects light from the corresponding pixel of the original image, but also collects light from the neighboring pixels of the corresponding pixel of the original image. For a 2D detector, light intensity received by any detector pixel $I^d_{jk}$ can be written as:

$$I_{jk}^d = a_0 I_{jk}^0 + a_1 \sum_{1}^{N_1} (\text{1st\_closest\_neighbor}) + a_2 \sum_{1}^{N_2} (\text{2nd\_closest\_neighbor}) + \ldots + a_p \sum_{1}^{N_p} (\text{pth\_closest\_neighbor}) + \ldots \quad (3)$$

where $I^0_{jk}$ is light intensity of pixel (jk) of the original image; $N_1$ is total number of the first closest neighboring pixels of pixel (jk), $N_2$ is the total number of the second closest neighboring pixels of pixel (jk), ... $N_p$ is the total number of the $p^{th}$ closest neighboring pixels of pixel (jk), ... ; and $a_0$, $a_1$, $a_2$, ... are called as neighboring-pixel-correlation-coefficients (NPCCs). The NPCCs $a_0$, $a_1$, $a_2$, $a_3$ ... can be calculated from PSF, the integration of PSF over the center pixel gives $a_0$; the integration of PSF over one of the first closest neighboring pixel gives $a_1$; the integration of PSF over one of the second closest neighboring pixel gives $a_2$; ... the integration of PSF over one of the pth closest neighboring pixel gives $a_p$; ... etc. NPCCs depend on size and shape of the aperture, the incident photon spectrum, the field of view, the shape of the pixels, the spacing between of the pixels, quantum efficiency and some other factors. The NPCCs are constants for a given image system and can be normalized as:

$$a_0 + a_1 N_1 + a_2 N_2 + \ldots a_p N_p \ldots = 1 \quad (4)$$

The best way to get the NPCCs is to do a real time measurement for the optical instrument with a point light source, the angular span of the light source should be much smaller than the diffraction limit of the aperture. At the focal plane, the pixel spacing should be much smaller than the diffraction pattern on the focal plane.

NPCCs can also be calculated if we know the PSF. Light intensity of pixels generated by PSF is proportional to the NPCCs. If the PSF is not available, we can use a blind estimate, starting with reasonable guessed values of NPCCs, then adjust the NPCCs until we reach the maximum sharpness for processed images.

Figures 2, 3:
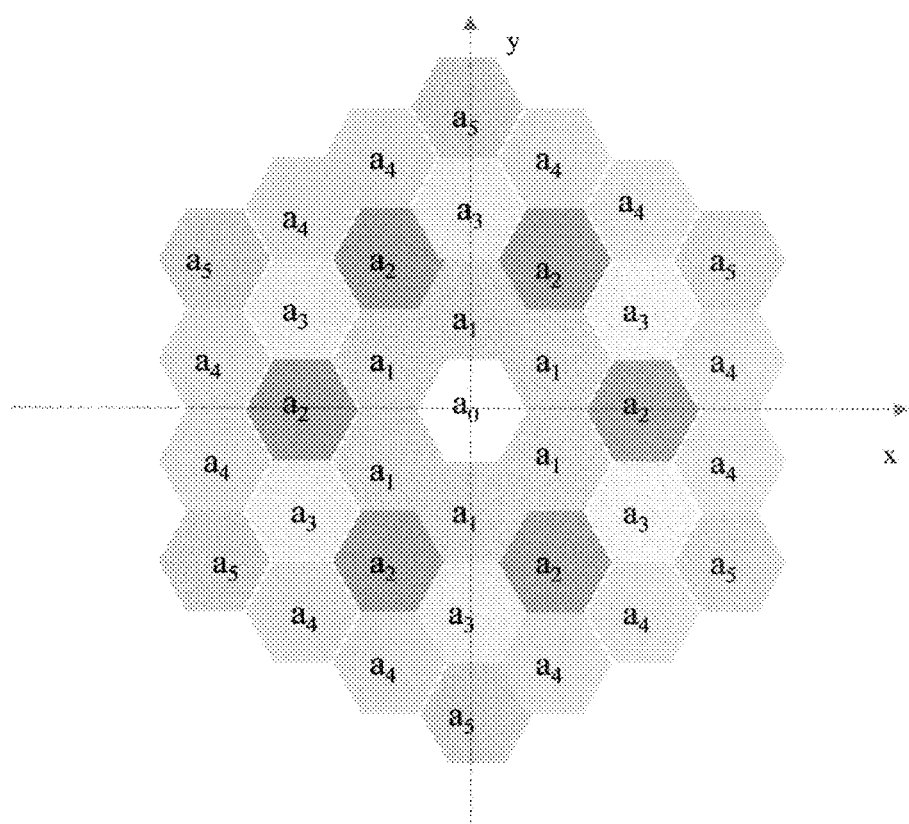
FIG. 2 is a diagram of geometry of the neighboring pixel labeling for a squared pixel array.
FIG. 3 is a diagram of geometry of the neighboring pixel labeling for a hexagon pixel array.
Figure 4:
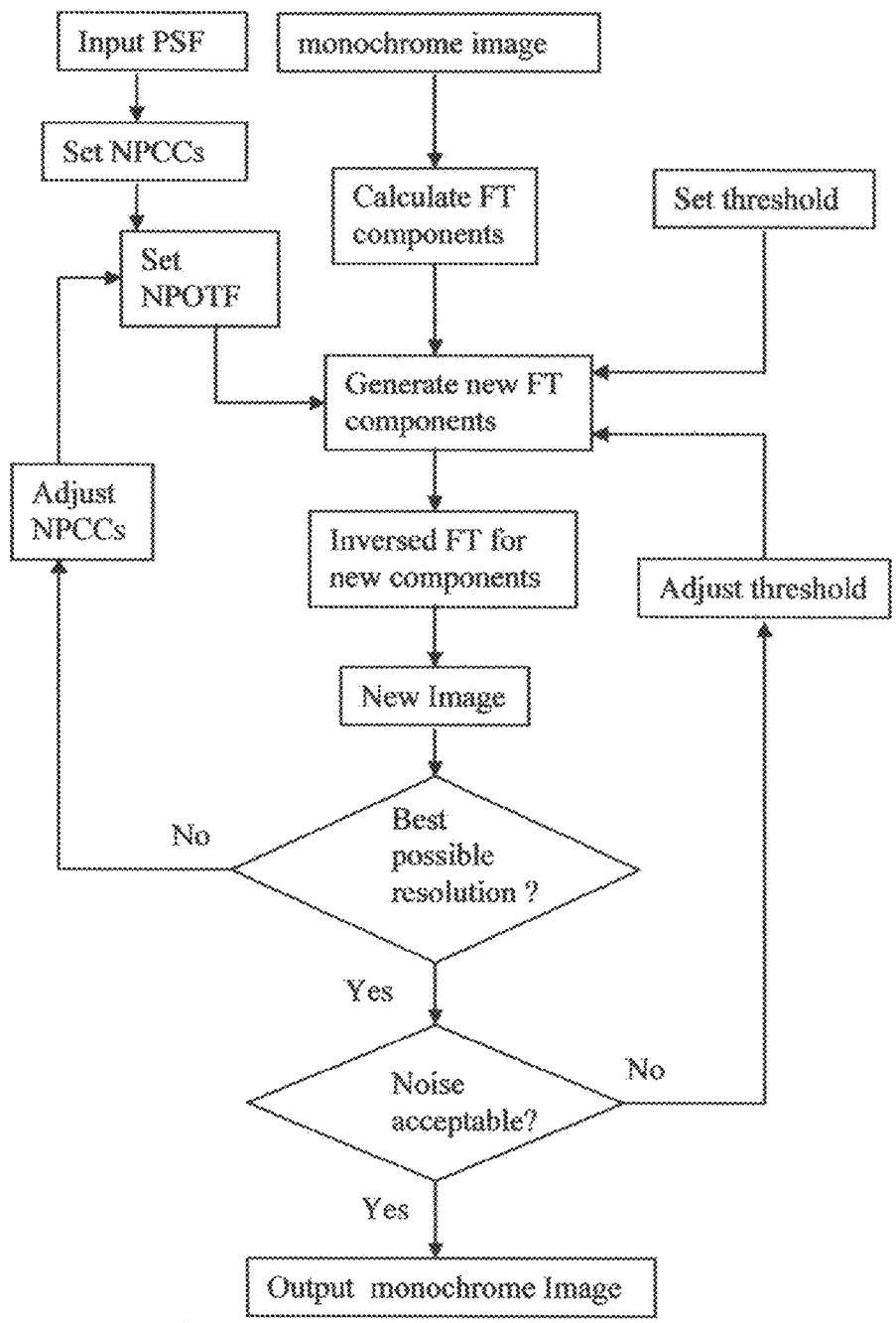
FIG. 4 is a flowchart of the deconvolution using NPOTF for a monochrome image.
Figure 5:
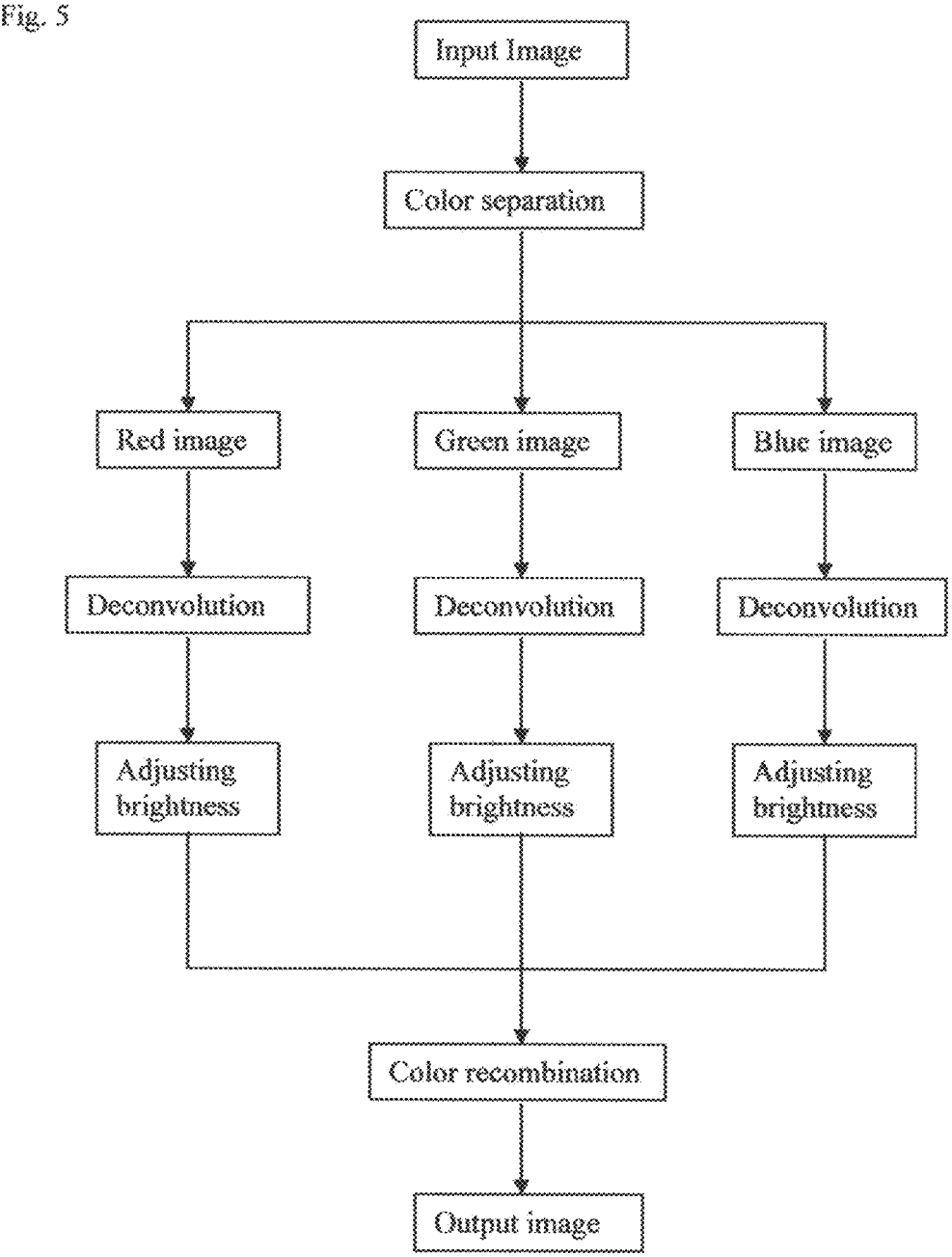
FIG. 5 is a flowchart of the present invention for color images.

For example, for a square array detector with square pixels, as shown in FIG. 2, eq. (3) can be written as:

$$I_{jk}^d = a_0 I_{jk}^0 + a_1 (I_{j,k+1}^0 + I_{j,k-1}^0 + I_{j+1,k}^0 + I_{j-1,k}^0) + a_2 (I_{j+1,k+1}^0 + I_{j+1,k-1}^0 + I_{j-1,k-1}^0) + \quad (5)$$

When we apply discrete Fourier Transform (FT) to both of the detected image and the original image, the Fourier components of $I^0_{jk}$, and $I^0_{jk}$ can be written as:

$$F_{lm}^d = \frac{1}{N} \sum_{j=0}^{N-1} \sum_{k=0}^{N-1} I_{jk}^d e^{-2\pi i \frac{(jl+km)}{N}} \quad (6)$$

and $$F_{lm}^0 = \frac{1}{N} \sum_{j=0}^{N-1} \sum_{k=0}^{N-1} I_{jk}^0 e^{-2\pi i \frac{(jl+km)}{N}} \quad (7)$$

From eq. (6) and eq. (5), we have $$F_{lm}^d = \frac{1}{N}\sum_{j=0}^{N-1}\sum_{k=0}^{N-1}[a_0 I_{j,k}^0 + a_1(I_{j,k+1}^0 + I_{j,k-1}^0 + I_{j+1,k}^0 + I_{j-1,k}^0) + a_2(I_{j+1,k+1}^0 + I_{j+1,k-1}^0 + I_{j-1,k+1}^0 + I_{j-1,k-1}^0) + \ldots]e^{-2\pi i\frac{(jl+km)}{N}} + \ldots \qquad (8)$$

Here comes the key point of this present invention: all of the indices in space domain, j, k, (j+1), (j−1), (k+1), (k−1), . . . , become dummy indices when we apply Fourier transform to the eq. (8). Because the indices j, k, (j+1), (j−1), (k+1), (k−1), . . . , are all dummy indices, we can greatly simplify eq. (8) with the following manipulations.

Look at the second term in the sum of equation (8), $$\frac{a_1}{N}\sum_{j=0}^{N-1}\sum_{k=0}^{N-1} I_{j+1,k}^0 e^{-2\pi i\frac{(jl+km)}{N}}$$

which only relates to $I^0_{jk,k+1}$, this term can be written as:

$$\frac{a_1}{N}\sum_{j=0}^{N-1}\sum_{k=0}^{N-1} I_{j+1,k}^0 e^{-2\pi i\frac{(jl+km)}{N}} = \frac{a_1}{N}\sum_{j'=1}^{N}\sum_{k=0}^{N-1} I_{j',k}^0 e^{-2\pi i\frac{[(j'+1)l+km]}{N}} \qquad (9)$$
$$= \frac{a_1}{N}\sum_{j'=1}^{N}\sum_{k=0}^{N-1} I_{j',k}^0 e^{-2\pi i\frac{(j'l+km)}{N}} e^{-\frac{(j'l+km)}{N}}.$$

Here j'=j+1. Then $$\frac{a_1}{N}\sum_{j'=1}^{N}\sum_{k=0}^{N-1} I_{j',k}^0 e^{-2\pi i\frac{(j'l+km)}{N}} e^{-\frac{2\pi i l}{N}} = \qquad (10)$$
$$\frac{a_1}{N}\sum_{j'=0}^{N-1}\sum_{k=0}^{N-1} I_{j',k}^0 e^{-2\pi i\frac{(j'l+km)}{N}} e^{-2\pi i l} + \frac{a_1}{N}(I_{N,k}^0 e^{-2\pi i} - I_{0,k}^0).$$

$I^0_{Nk}$ does not exist. But if we use periodical boundary conditions, which means that the image repeats itself when the pixels are out of the detector, then $I^0_{Nk} = I^0_{0k}$, and $I^0_{jN} = I^0_{j0}$.

This periodical boundary conditions also give us:

$I^0_{-1,k} = I^0_{N-1,k},\ I^0_{j,-1} = I^0_{j,N-1},\ I^0_{-2,k} = I^0_{N-2,k},\ I^0_{j,-2} = I^0_{j,N-2},\ I^0_{-3,k} = I^0_{N-3,k},\ I^0_{j,-3} = I^0_{j,N-3},\ \ldots$;

Then from (7) and (10), we have:

$$\frac{a_1}{N}\sum_{j=1}^{N-1}\sum_{k=0}^{N-1} I_{j+1,k}^0 e^{-2\pi i\frac{(jl+km)}{N}} = \frac{a_1}{N}\sum_{j=0}^{N-1}\sum_{k=0}^{N-1} I_{j',k}^0 e^{-2\pi i\frac{(jl+km)}{N}} e^{-\frac{2\pi i l}{N}} \qquad (11)$$
$$= \frac{a_1}{N} F_{lm}^0 e^{-\frac{2\pi i l}{N}}.$$

From (11), we can see that the Fourier components of the first closest neighboring pixel $I^0_{j+1,k}$ can be expressed by the Fourier component of the center pixel $I^0_{jk}$ with an addition phase factor.

Further more, we can combine the $2^{nd}$ and $3^{rd}$ terms of Eq. (8) as:

$$\frac{a_1}{N}\sum_{j=0}^{N-1}\sum_{k=0}^{N-1}(I_{j+1,k}^0 + I_{j-1,k}^0)e^{-2\pi i\frac{(jl+km)}{N}} \qquad (12)$$
$$= \frac{a_1}{N}\sum_{j'=0}^{N-1}\sum_{k'=0}^{N-1} I_{j',k}^0 e^{-2\pi i\frac{(j'l+km)}{N}}\left(e^{-\frac{2\pi i l}{N}} + e^{\frac{2\pi i l}{N}}\right)$$
$$= \frac{a_1}{N} F_{lm}^0 \cdot 2\cos\left(\frac{2\pi l}{N}\right).$$

And we can combine the $4^{th}$ and $5^{th}$ terms of Eq. (8) as:

$$\frac{a_1}{N}\sum_{j=0}^{N-1}\sum_{k=0}^{N-1}(I_{j+1,k}^0 + I_{j-1,k}^0)e^{-2\pi i\frac{(jl+km)}{N}} = \qquad (13)$$
$$\frac{a_1}{N}\sum_{j'=0}^{N-1}\sum_{k'=0}^{N-1} I_{j',k}^0 e^{-2\pi i\frac{(j'l+km)}{N}}\left(e^{-\frac{2\pi i l}{N}} + e^{\frac{2\pi i l}{N}}\right) = \frac{a_1}{N} F_{lm}^0 \cdot 2\cos\left(\frac{2\pi l}{N}\right).$$

therefore, from all of the $1^{st}$ closest neighboring pixels terms in Eq. (8), we have:

$$\frac{a_1}{N}\sum_{j=1}^{N-1}\sum_{k=0}^{N-1}(I_{j,k+1}^0 + I_{j,k-1}^0 + I_{j+1,k}^0 + I_{j-1,k}^0)e^{-2\pi i\frac{(jl+km)}{N}} = \qquad (14)$$
$$\frac{a_1}{N} F_{lm}^0 \cdot 2\left[\cos\left(\frac{2\pi l}{N}\right) + \cos\left(\frac{2\pi m}{N}\right)\right].$$

Similarly, we have:

$$\frac{a_2}{N}\sum_{j=1}^{N-1}\sum_{k=0}^{N-1}(I_{j+1,k+1}^0 + I_{j+1,k-1}^0 + I_{j-1,k+1}^0 + I_{j-1,k-1}^0)e^{-2\pi i\frac{(jl+km)}{N}} = \qquad (15)$$
$$\frac{a_2}{N} F_{lm}^0 \cdot 2\left[\cos\left(2\pi\frac{l+m}{N}\right) + \cos\left(2\pi\frac{l-m}{N}\right)\right].$$

$$\frac{a_3}{N}\sum_{j=1}^{N-1}\sum_{k=0}^{N-1}(I_{j,k+2}^0 + I_{j,k-2}^0 + I_{j+2,k}^0 + I_{j-2,k}^0)e^{-2\pi i\frac{(jl+km)}{N}} = \qquad (16)$$
$$\frac{a_3}{N} F_{lm}^0 \cdot 2\left[\cos\left(\frac{4\pi l}{N}\right) + \cos\left(\frac{4\pi m}{N}\right)\right].$$

$$\frac{a_4}{N}\sum_{j=1}^{N-1}\sum_{k=0}^{N-1}(I_{j+1,k+2}^0 + I_{j+1,k-2}^0 + I_{j+2,k+1}^0 + I_{j-1,k+2}^0 + I_{j-1,k-2}^0 + I_{j-2,k+1}^0 + I_{j-2,k-1}^0)e^{-2\pi i\frac{(jl+km)}{N}} = \qquad (17)$$
$$\frac{a_4}{N} F_{lm}^0 \cdot 2\left[\cos\frac{2\pi(2l+m)}{N} + \cos\frac{2\pi(2l-m)}{N} + \cos\frac{2\pi(l+2m)}{N} + \cos\frac{2\pi(l-2m)}{N}\right].$$

Let's introducing a neighboring-pixel-optical-transfer-function (NPOTF) $\Delta_{lm}$ as:

$$\Delta_{lm} = a_0 + \Delta_{lm}^1 + \Delta_{lm}^2 + \Delta_{lm}^3 + \Delta_{lm}^4 + \Delta_{lm}^5 + \Delta_{lm}^6 + \Delta_{lm}^7 + \Delta_{lm}^8 + \ldots \qquad (18)$$

where $$\Delta_{lm}^1 = 2a_1\left[\cos\left(\frac{2\pi d}{N}\right) + \cos\left(\frac{2\pi m}{N}\right)\right] \qquad (19)$$

$$\Delta_{lm}^2 = 2a_2\left[\cos\left(2\pi\frac{l+m}{N}\right) + \cos\left(2\pi\frac{l-m}{N}\right)\right] \qquad (20)$$

-continued $$\Delta_{lm}^3 = 2a_3\left[\cos\left(\frac{2\pi \cdot 2l}{N}\right) + \cos\left(\frac{2\pi \cdot 2m}{N}\right)\right] \quad (21)$$

$$\Delta_{lm}^4 = 2a_4\left[\cos\frac{2\pi(2l+m)}{N} + \cos\frac{2\pi(2l-m)}{N} + \cos\frac{2\pi(l+2m)}{N} + \cos\frac{2\pi(l-m)}{N}\right] \quad (22)$$

$$\Delta_{lm}^5 = 2a_5\left[\cos\left(2\pi\frac{2l+2m}{N}\right) + \cos\left(2\pi\frac{2l-2m}{N}\right)\right] \quad (23)$$

$$\Delta_{lm}^6 = 2a_6\left[\cos\left(\frac{2\pi \cdot 3l}{N}\right) + \cos\left(\frac{2\pi \cdot 3m}{N}\right)\right] \quad (24)$$

$$\Delta_{lm}^7 = 2a_7\left[\cos\frac{2\pi(3l+m)}{N} + \cos\frac{2\pi(3l-m)}{N} + \cos\frac{2\pi(l+3m)}{N} + \cos\frac{2\pi(l-3m)}{N}\right] \quad (25)$$

$$\Delta_{lm}^8 = 2a_7\left[\cos\frac{2\pi(3l+2m)}{N} + \cos\frac{2\pi(3l-2m)}{N} + \cos\frac{2\pi(2l+3m)}{N} + \cos\frac{2\pi(2l-3m)}{N}\right] \quad (26)$$

Therefore, From eq. (8), the relation between the Fourier component of the detected image and the original image can be written as:

$$F_{lm}^d = F_{lm}^0 \cdot \Delta_{lm}. \quad (27)$$

and the Fourier components of the original image can be written as $$F_{lm}^0 = \frac{F_{lm}^d}{\Delta_{lm}}. \quad (28)$$

Eq. (28) shows that we now have a one-to-one relations between Fourier components of the original image and the Fourier components of the detected image by using NPOTF.

And finally, we can regenerate the original image with inversed discrete Fourier transform.

$$I_{jk}^0 = \frac{1}{N}\sum_{l=0}^{N-1}\sum_{m=0}^{N-1} F_{lm}^0 e^{2\pi i\frac{(jl+km)}{N}} = \frac{1}{N}\sum_{l=0}^{N-1}\sum_{m=0}^{N-1} \frac{F_{lm}^d}{\Delta_{lm}} e^{2\pi i\frac{(jl+km)}{N}} \quad (29)$$

And this is the image with enhanced image with resolution beyond the diffraction limit.

Look at formula (29), we can see that $I_{jk}^0$ may have singular points. This means that if the diffraction pattern is not relatively small, the NPOTF $\Delta_{lm}$, may become zero for some Fourier components and noise goes to infinity. To avoid this problem, when the diffraction pattern is not relatively small, then we need to set up a threshold for the NPOTF $\Delta_{lm}$, which means that when $\Delta_{lm}$ is smaller than the threshold, we use the threshold value or some other value to replace $\Delta_{lm}$. The threshold can be chosen as either a constant or a function of the FT order (l,m). General speaking, the threshold is related to the noise level of the processed image, the larger the threshold, the lower the noise level. But when the threshold is too large, the image becomes blurred again.

Procedure for computing the present invention is illustrated in flow charts as shown in FIG. (4) and FIG. (5). FIG. (4) shows the flow chat of applying the deconvolution method of the present invention to a monochrome image, which has the procedure as the following:

(a) selecting a reasonable PSF, and calculating initial NPCCs for the monochrome image;
(b) applying FT for the input image;
(c) building a NPOTF using the NPCCs and initial threshold in frequency domain;
(d) applying the NPOTF to the Fourier components, and generating modified new Fourier components;
(e) applying inversed FT to these new Fourier components to generate a new, higher resolution image; and
(f) adjusting NPCCs and thresholds, and repeating steps (b)-(e) until we achieve best possible resolution with acceptable noise level.

Because PSF depends on the light wavelength, images of different colors have different NPCCs and NPOTFs. For a full color image, for example a RGB image, we need to separate the color image into monochrome grayscale images, and process each monochrome image using the steps shown in FIG. (4). The flow chat of processing color images is shown in FIG. (5), which includes the following steps:

(a) separating the color image into monochrome images;
(b) applying the deconvolution method, as shown in FIG. (4), to each of the monochrome images;
(c) adjusting brightness of the processed monochrome images, the brightness of these monochrome images should be adjusted this way, so that the color of any bulk areas of the unprocessed image should match the same color for the same bulk area of the processed image; and
(d) recombining the monochrome images for an output color image.

For geometries of detector arrays other than square array, Eq. (18), Eq. (28) and Eq. (29) still valid, only the NPOTF components are different. For example, for an $N_x \times N_y$ rectangular array pixel detector, we have:

$$\Delta_{lm}^1 = 2a_1\left[\cos\left(\frac{2\pi d}{N_x}\right) + \cos\left(\frac{2\pi m}{N_y}\right)\right] \quad (30)$$

$$\Delta_{lm}^2 = 2a_2\left\{\cos\left[2\pi\left(\frac{l}{N_x} + \frac{m}{N_y}\right)\right] + \cos\left[2\pi\left(\frac{l}{N_x} - \frac{m}{N_y}\right)\right]\right\} \quad (31)$$

$$\Delta_{lm}^3 = 2a_3\left[\cos\left(\frac{2\pi \cdot 2l}{N_x}\right) + \cos\left(\frac{2\pi \cdot 2m}{N_y}\right)\right] \quad (32)$$

$$\Delta_{lm}^4 = 2a_4\left\{\cos\left[2\pi\left(\frac{2l}{N_x} + \frac{m}{N_y}\right)\right] + \cos\left[2\pi\left(\frac{2l}{N_x} - \frac{m}{N_y}\right)\right] + \cos\left[2\pi\left(\frac{l}{N_x} + \frac{2m}{N_y}\right)\right] + \cos\left[2\pi\left(\frac{l}{N_x} - \frac{2m}{N_y}\right)\right]\right\} \quad (33)$$

$$\Delta_{lm}^5 = 2a_5\left[\cos\left(2\pi\frac{2l+2m}{N_x}\right) + \cos\left(2\pi\frac{2l-2m}{N_y}\right)\right] \quad (34)$$

$$\Delta_{lm}^6 = 2a_6\left[\cos\left(\frac{2\pi \cdot 3l}{N_x}\right) + \cos\left(\frac{2\pi \cdot 3m}{N_y}\right)\right]. \quad (35)$$

$$\Delta_{lm}^7 = 2a_7\left\{\cos\left[2\pi\left(\frac{3l}{N_x} + \frac{m}{N_y}\right)\right] + \cos\left[2\pi\left(\frac{3l}{N_x} - \frac{m}{N_y}\right)\right] + \cos\left[2\pi\left(\frac{l}{N_x} + \frac{3m}{N_y}\right)\right] + \cos\left[2\pi\left(\frac{l}{N_x} - \frac{3m}{N_y}\right)\right]\right\}. \quad (36)$$

$$\Delta_{lm}^8 = 2a_8\left\{\cos\left[2\pi\left(\frac{3l}{N_x} + \frac{2m}{N_y}\right)\right] + \cos\left[2\pi\left(\frac{3l}{N_x} - \frac{2m}{N_y}\right)\right] + \cos\left[2\pi\left(\frac{2l}{N_x} + \frac{3m}{N_y}\right)\right] + \cos\left[2\pi\left(\frac{2l}{N_x} - \frac{3m}{N_y}\right)\right]\right\}. \quad (37)$$

For other detector array geometry, we can setup a 2-D x-y coordinates using the center pixel ($a_0$) as origin (0, 0). For a 2D detector with the $N_x$ pixels in x-direction and $N_y$ pixels in y-direction, any neighboring pixel can be labeled by its coordinate (x, y). Because the pixels are regularly spaced, $N_x/x$ and $N_y/y$ are integers. The NPOTF can be written as:

$$\Delta_{lm} = a_0 + a_1 \sum_{1}^{N_1} \exp\left[2\pi i\left(\frac{x \cdot l}{N_x \cdot n_x} + \frac{y \cdot m}{N_y \cdot n_y}\right)\right] + \quad (41)$$

$$a_2 \sum_{1}^{N_2} \exp\left[2\pi i\left(\frac{x \cdot l}{N_x \cdot n_x} + \frac{y \cdot m}{N_y \cdot n_y}\right)\right] +$$

$$a_p \sum_{1}^{N_p} \exp\left[2\pi i\left(\frac{x \cdot l}{N_x \cdot n_x} + \frac{y \cdot m}{N_y \cdot n_y}\right)\right]$$

Here x, y are coordinates of pixels in x and y directions respectively. $N_1$ is the total number of the first closest neighboring pixels; $N_2$ is the total number of pixels of the second closed neighboring pixels; . . . N is the total number of the nth closest neighboring pixels; . . . etc. The first summation is over all of the first closest neighboring pixels; the second summation is over all of the second closest neighboring pixels; . . . the pth summation is over all of the pth closest neighboring pixels . . . etc. Note x's and y's have different values for different pixels. For example, for the first closest neighboring pixels of a square spacing detector, we have four pixels with coordinates of (1, 1), (1,–1), (–1, 1) and (–1, –1). If a director array has a symmetry that for each pixel of coordinate (x, y), there is a pixel with coordinate (–x, –y), then these exponential terms in eq. (41) can be written in terms of cosine functions.

Another example is for a hexagon detector array, the NPCCs arrangement is shown in FIG. 3. We can use formula (41) to calculate the NPOTF $\Delta_{lm}$. For example, the coordinates of the center of the six first closest neighboring pixels are:

$$\left(\frac{\sqrt{3}}{2}, \frac{1}{2}\right), \quad (0, 1), \quad \left(-\frac{\sqrt{3}}{2}, \frac{1}{2}\right),$$

$$\left(-\frac{\sqrt{3}}{2}, -\frac{1}{2}\right), \quad (0, -1) \text{ and } \left(\frac{\sqrt{3}}{2}, -\frac{1}{2}\right).$$

Therefore, for the first order component of $\Delta_{lm}$, we have:

$$\Delta_{lm}^1 = a_1\left[e^{-2\pi i\left(\frac{\sqrt{3}\,l}{N_x}+\frac{m}{2N_y}\right)} + e^{-2\pi i\left(\frac{m}{N_y}\right)} + e^{-2\pi i\left(\frac{-\sqrt{3}\,l}{2N_x}+\frac{m}{2N_y}\right)} + \right. \quad (42)$$

$$\left. e^{2\pi i\left(\frac{\sqrt{3}\,l}{2N_x}+\frac{m}{2N_y}\right)} + e^{2\pi i\left(\frac{m}{N_y}\right)} + e^{2\pi i\left(\frac{\sqrt{3}\,l}{2N_x}+\frac{m}{2N_y}\right)}\right]$$

or it can be written as cosine form as:

$$\Delta_{lm}^1 = \quad (43)$$

$$2a_1\left[\cos 2\pi\left(\frac{\sqrt{3}\,l}{2N_x}+\frac{m}{2N_y}\right) + \cos 2\pi\left(\frac{\sqrt{3}\,l}{2N_x}-\frac{m}{2N_y}\right) + \cos 2\pi\left(\frac{m}{N_y}\right)\right].$$

Similarly, we can calculate other order of components of NPOTF.

Feasibility of the present invention has been approved by modeling and processing real images.

Figure 6:
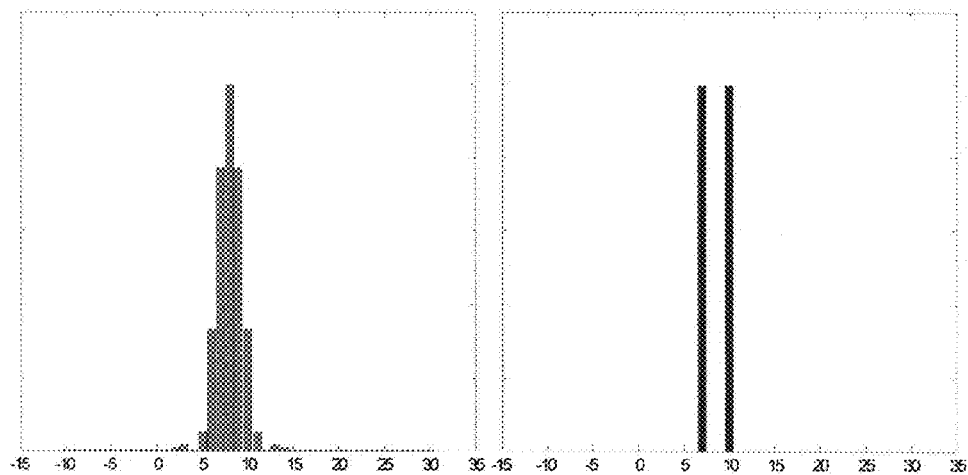
FIG. 6-(a) is a modeling result of a diffraction pattern of a 1-D optical aperture.
Figure 6:
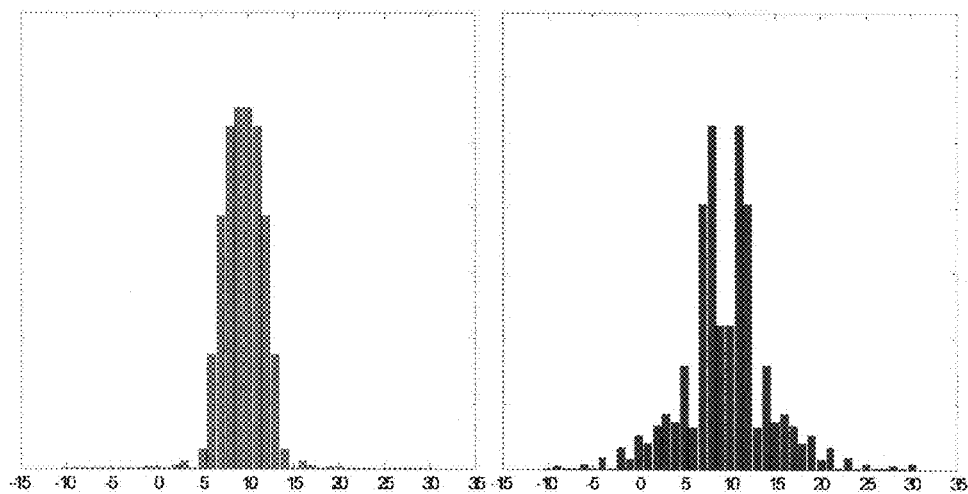

FIG. 6 shows modeling result of the present invention with linear (1D) array pixel detector. For a diffraction limited optical system with PSF shown as FIG. 6-(a), light from a point source is spread over many pixels, and the light intensity in these pixels gives us the NPCCs. The light intensity of the center pixel, which has the maximum light intensity, gives the coefficient $a_0$; the light intensity of the two pixels next to the center pixel give the coefficient $a_1$; the light intensity of the two second-closet pixels to the center pixel give the coefficient $a_2$; . . . etc. For two point objects separated by a small angular distance shown as FIG. 6-(b), due to the diffraction effect, the two point objects become undistinguishable as shown in FIG. 6-(c), the detected image only shows a single peak. But when we process the detected image (6-(c)) with the deconvolution method of the present invention, the two point objects are clearly separated in the processed image, as shown in FIG. 6-(d). The two peaks have the same positions with the original image, with some processing induced noise.

Figure 7:
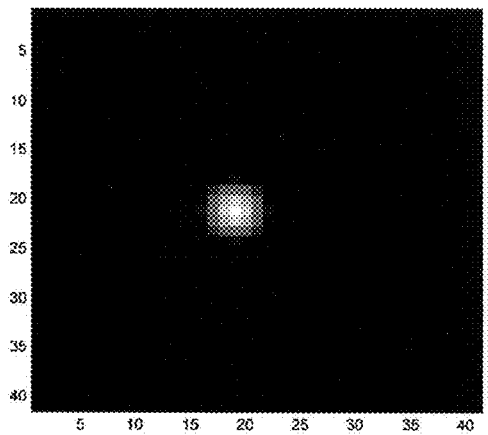
FIG. 7-(a) is a modeling result of a diffraction pattern of a 2-D optical aperture.
Figure 7:
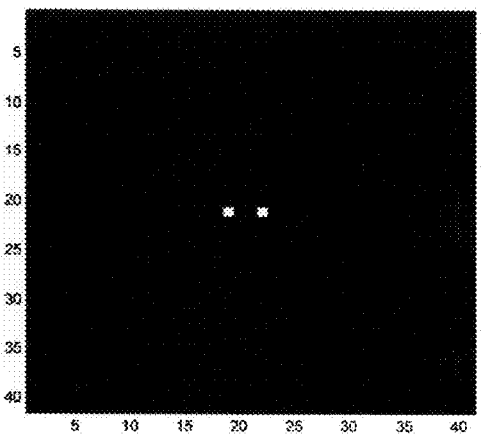
Figure 7:
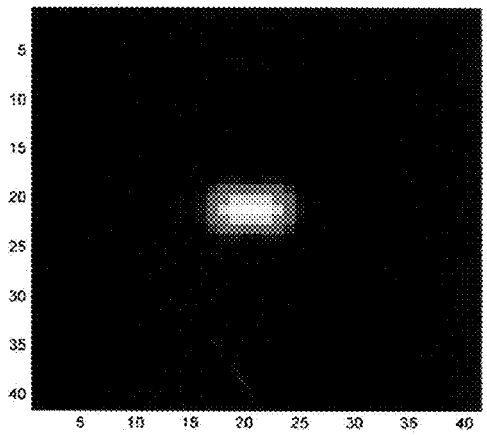
Figure 7:
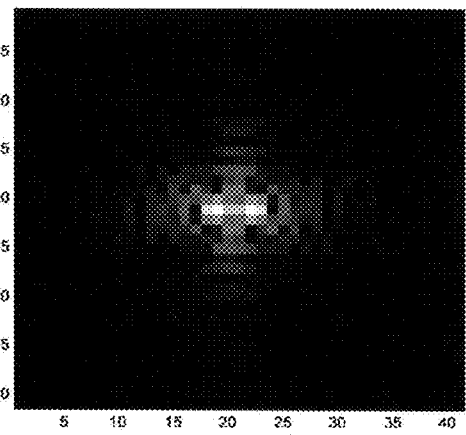
Figure 8:
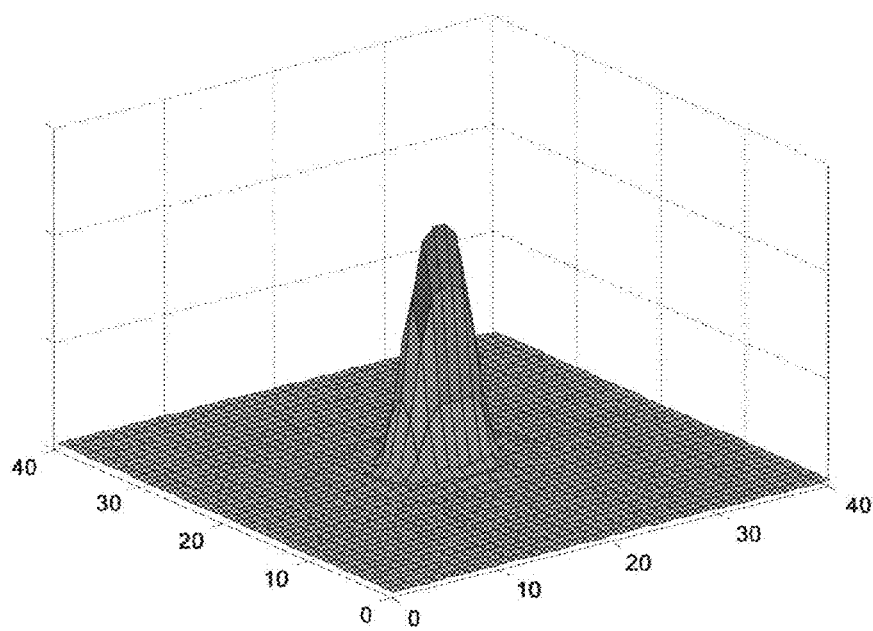
FIG. 8-(a) is a 3-D diagram illustrating the light intensity distribution of FIG. 7-(c), the two objects are undistinguishable.
Figure 8:
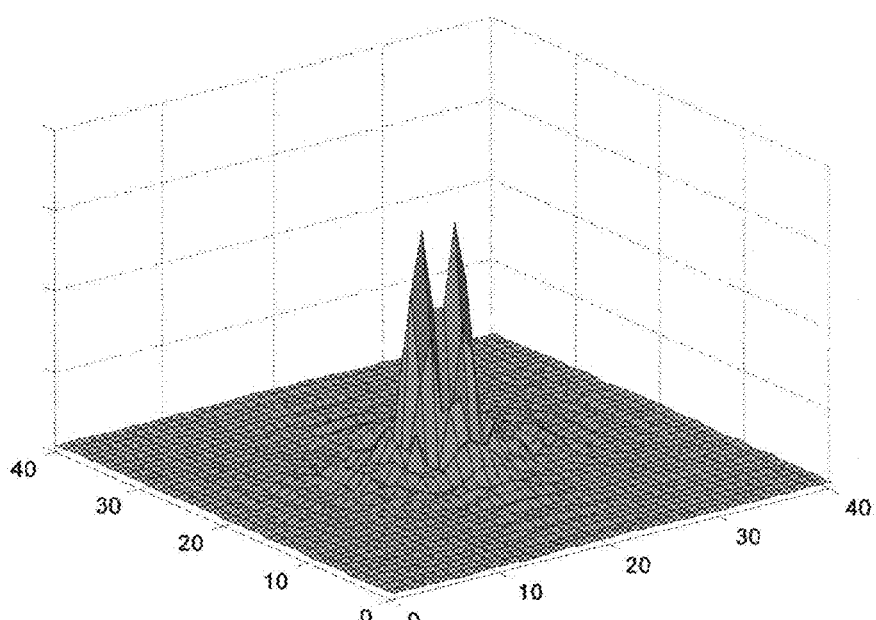

FIG. 7 shows modeling result of the present invention for with square array and square pixel detector. For a diffraction limited circular aperture optical system with PSF shown as FIG. 7-(a), light from a point source is spread over as Any disc pattern. Light from a point source is spread over many pixels, and the light intensity in the pixels gives us the NPCCs. The light intensity in the center pixel, which has the maximum light intensity, gives the coefficient $a_0$; the light intensity of the four pixels that are the closest to the center pixel give the coefficient $a_1$; the light intensity of the four second-closet pixels to the center pixel give the coefficient $a_2$; . . . etc. For two point objects separated by a small angular distance shown as FIG. 7-(b), due to the diffraction effect, the two point objects become undistinguishable as shown in FIG. 7-(c), the detected image only shows a single peak. But when we process the detected image (7-(c)) with the present deconvolution method, the two point objects become distinguishable in the processed image as shown in FIG. 7-(d). 3-D plots of FIG. 7-(c) and 7-(d) are shown in FIG. 8-(a) and 8-(b). FIG. 8-(a) is a 3-D diagram illustrating the light intensity distribution of FIG. 7-(c), the two objects are undistinguishable; FIG. 8-(a) is a 3-D diagram illustrating the light intensity distribution of FIG. 7-(d), the two objects are clearly separated from each other. From FIG. 7-(d) and FIG. 8-(b), we can see that the two objects have the same positions with the original image, with some processing induced noise.

Two real images were processed to test the present invention. Because PSFs of the two images were not available, blind estimation was used to set the NPCCs. The two images were RGB images, only the green color images were processed.

Figure 9:
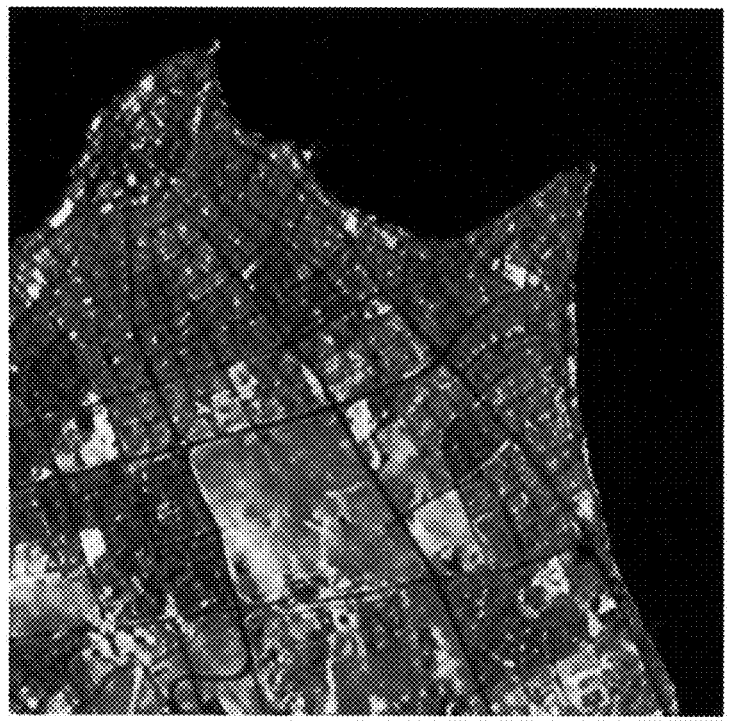
FIG. 9-(a) represents a partial image of space image of Kuwait in 1991 (courtesy of NASA/Goddard Space Flight Center).
Figure 9:
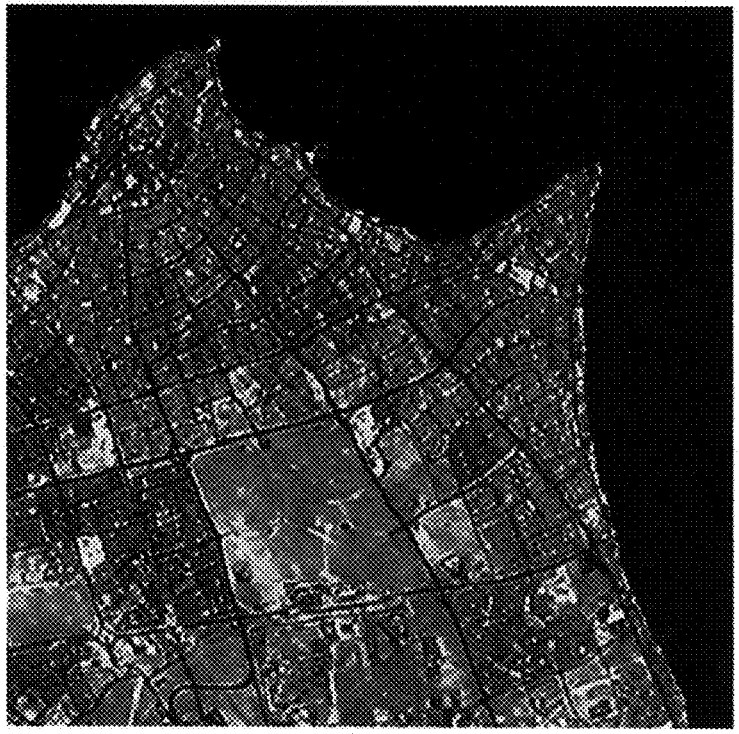

One example of using this invention to increase resolution of a given image is shown in FIG. 9. FIG. 9-(a) is an enlarged portion of the image of Kuwait oil field (courtesy of NASA/Goddard Space Flight Center) in 1991 (http://sys.gsfc.nasa.gov/vis/a000000/a002700/a002715/image1.tif). We can see that the image is somehow blurred due to diffraction effect. We processed the image of FIG. 9-(a) using the present invention with the NPCC's of $a_0$=0.26, $a_1$=0.075, $a_2$=0.054, $a_3$=0.027, and $a_4$=0.014. The threshold was set at 1/256. The processed image is shown in FIG. 9-(b), the image becomes much sharper, and some new features showed up.

Figure 10:
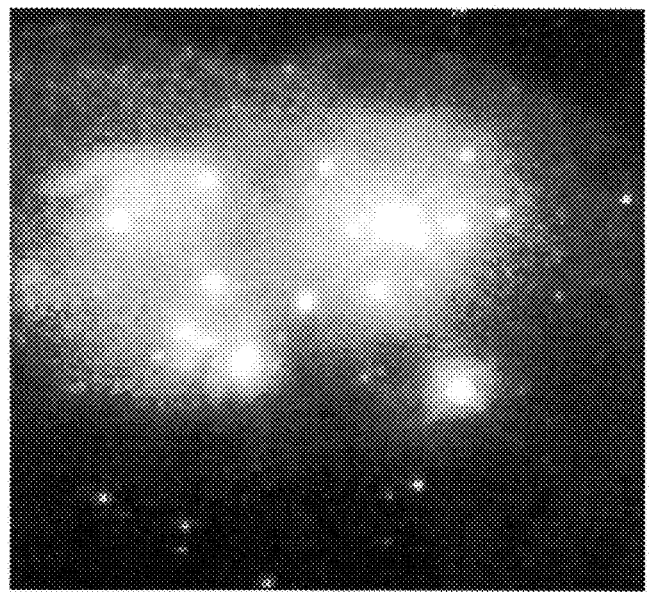
FIG. 10-(a) represents a partial image of 'Double Bubble' of Gas and Dust in the Large Magellanic Cloud taken by Hubble Space Telescope (courtesy of NASA and The Hubble Heritage).
Figure 10:
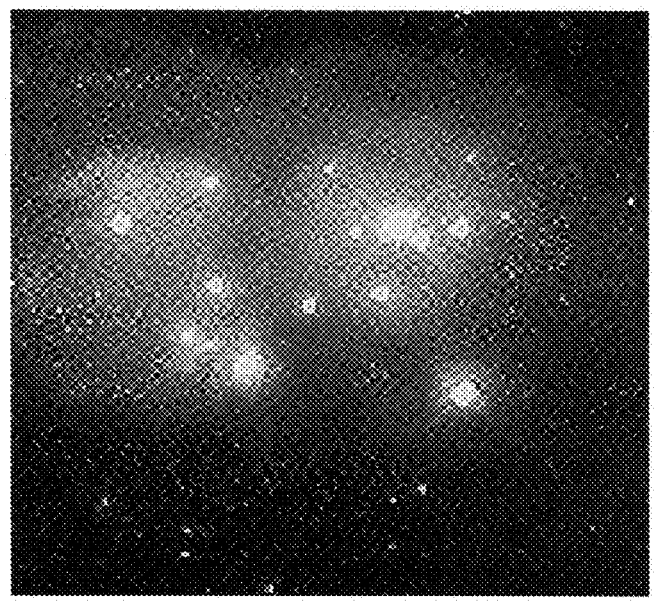

Another example of using this invention to increase resolution of a given image is shown in FIG. 10. FIG. 10-(a) is an enlarged portion from the image of 'Double Bubble' of Gas and Dust in the Large Magellanic Cloud taken by Hubble Space Telescope (courtesy of NASA and The Hubble Heritage) (http://imgsrc.hubblesite.org/hu/db/2002/29/images/a/formats/full_tif.tif). We can see that the image is smoky due to diffraction effect. We processed the image of FIG. 10-(a) using the present invention with the NPCC's of $a_0$=0.24, $a_1$=0.096, $a_2$=0.059, $a_3$=0.022, and $a_4$=0.0073. The threshold was set at 1/256. The processed image is shown in FIG. 10-(b), many new stars and new features are unveiled.

What is claimed is:

1. An image processing method, which is able to enhance resolution of images taken by an imaging instrument, comprising steps of:
    a) separating the input multi-spectral image into monochrome images;
    b) estimating point spread function (PSF) for each monochrome image;
    c) generating neighboring pixel correlation coefficients (NPCC) from the PSF for each monochrome image;
    d) applying Discrete Fourier transform (FT) for each of the monochrome images;
    e) calculating Fourier components for each pixel of the monochrome image;
    f) generating a neighboring-pixel-optical-transfer-function (NPOTF) using the NPCCs and periodical boundary conditions for each Fourier component;
    g) setting a threshold for the NPOTF;
    h) modifying the NPOTF with the threshold;
    i) generating new Fourier components by dividing each of the old Fourier components by the modified NPOTF respectively;
    j) generating new monochrome images by performing reversed Fourier transform using the new Fourier components;
    k) repeating steps from b) to i) with different NPCCs and different threshold until the image becomes sharpest with lowest noise;
    l) adjusting brightness of each monochrome images; and
    m) combining the new monochrome images into a new output multi-spectral image.

2. The image processing method as in claim 1, wherein said imaging instrument is comprising of:
    a) an entrance aperture; and
    b) regularly spaced pixel detector or pixel detectors.

3. The image processing method as in claim 1, wherein said imaging instrument is comprising of:
    a) an entrance aperture; and
    b) rectangular array regularly spaced pixel detector or pixel detectors.

4. The image processing method as in claim 1, wherein said imaging instrument is comprising of:
    a) an entrance aperture; and
    b) hexagon array regularly spaced pixel detector or pixel detectors.

5. The imaging processing method as in claim 1, wherein said imaging instrument is diffraction limited.

6. The image processing method as in claim 1, wherein said imaging instrument is comprising of:
    a) a radar antenna; and
    b) a radar detector.

7. The imaging instrument as in claim 1, wherein said PSF pattern is much larger than the pixel spacing.

8. The imaging processing method as in claim 1, wherein said NPCC of a neighboring pixel is proportional to the amount of photons captured by the pixel by a point light source centered at the center pixel.

9. The imaging processing method as in claim 1, wherein said NPOTF is generated by periodical boundary conditions.

10. The imaging processing method as in claim 1, wherein said NPOTF given by the following formula:

$$\Delta_{lm} = a_0 + \Delta^1_{lm} + \Delta^2_{lm} + \Delta^3_{lm} + \Delta^4_{lm} + \Delta^5_{lm} + \Delta^6_{lm} + \Delta^7_{lm} + \Delta^8_{lm} + \ldots$$

wherein $$\Delta^1_{lm} = 2a_1\left[\cos\left(\frac{2\pi l}{N_x}\right) + \cos\left(\frac{2\pi m}{N_y}\right)\right] \quad (30)$$

$$\Delta^2_{lm} = 2a_2\left\{\cos\left[2\pi\left(\frac{l}{N_x} + \frac{m}{N_y}\right)\right] + \cos\left[2\pi\left(\frac{l}{N_x} - \frac{m}{N_y}\right)\right]\right\} \quad (31)$$

$$\Delta^3_{lm} = 2a_3\left[\cos\left(\frac{2\pi \cdot 2l}{N_x}\right) + \cos\left(\frac{2\pi \cdot 2m}{N_y}\right)\right] \quad (32)$$

$$\Delta^4_{lm} = 2a_4\left\{\cos\left[2\pi\left(\frac{2l}{N_x} + \frac{m}{N_y}\right)\right] + \cos\left[2\pi\left(\frac{2l}{N_x} - \frac{m}{N_y}\right)\right] + \cos\left[2\pi\left(\frac{l}{N_x} + \frac{2m}{N_y}\right)\right] + \cos\left[2\pi\left(\frac{l}{N_x} - \frac{2m}{N_y}\right)\right]\right\} \quad (33)$$

$$\Delta^5_{lm} = 2a_5\left[\cos\left(2\pi\frac{2l+2m}{N_x}\right) + \cos\left(2\pi\frac{2l-2m}{N_y}\right)\right] \quad (34)$$

$$\Delta^6_{lm} = 2a_6\left[\cos\left(\frac{2\pi \cdot 3l}{N_x}\right) + \cos\left(\frac{2\pi \cdot 3m}{N_y}\right)\right]. \quad (35)$$

$$\Delta^7_{lm} = 2a_7\left\{\cos\left[2\pi\left(\frac{3l}{N_x} + \frac{m}{N_y}\right)\right] + \cos\left[2\pi\left(\frac{3l}{N_x} - \frac{m}{N_y}\right)\right] + \cos\left[2\pi\left(\frac{l}{N_x} + \frac{3m}{N_y}\right)\right] + \cos\left[2\pi\left(\frac{l}{N_x} - \frac{3m}{N_y}\right)\right]\right\}. \quad (36)$$

$$\Delta^8_{lm} = 2a_8\left\{\cos\left[2\pi\left(\frac{3l}{N_x} + \frac{2m}{N_y}\right)\right] + \cos\left[2\pi\left(\frac{3l}{N_x} - \frac{2m}{N_y}\right)\right] + \cos\left[2\pi\left(\frac{2l}{N_x} + \frac{3m}{N_y}\right)\right] + \cos\left[2\pi\left(\frac{2l}{N_x} - \frac{3m}{N_y}\right)\right]\right\}. \quad (37)$$

$a_0, a_1, a_2, \ldots$ are the neighboring-pixel-correlation-coefficients (NPCCs), $N_x$ is the number of pixels in x-direction and $N_y$ is the number of pixels in y-direction of the rectangular array director,
l is the order of Fourier components in x-direction and m is the order of Fourier components in y-direction.

11. The imaging processing method as in claim 1, wherein said NPOTF given by the following formula:

$$\Delta_{lm} = a_0 + a_1 \sum_1^{N_1} \exp\left[2\pi i\left(\frac{x \cdot l}{N_x \cdot n_x} + \frac{y \cdot m}{N_y \cdot n_y}\right)\right] + a_2 \sum_1^{N_2} \exp\left[2\pi i\left(\frac{x \cdot l}{N_x \cdot n_x} + \frac{y \cdot m}{N_y \cdot n_y}\right)\right] + a_P \sum_1^{N_P} \exp\left[2\pi i\left(\frac{x \cdot l}{N_x \cdot n_x} + \frac{y \cdot m}{N_y \cdot n_y}\right)\right] \quad (41)$$

Here x, y are coordinates of pixels in x and y directions respectively;
$N_1$ is the total number of the first closest neighboring pixels; $N_2$ is the total number of pixels of the second closed neighboring pixels; ... $N_p$ is the total number of the nth closest neighboring pixels; ... etc.;
the first summation is over all of the first closest neighboring pixels; the second summation is over all of the second closest neighboring pixels; ... the pth summation is over all of the pth closest neighboring pixels ... etc.;

$N_x$ is the total number of pixels in x-direction and $N_y$ is the total number of pixels in y-direction;

$n_x$ is pixel spacing in x-direction, and $n_y$ is the pixel spacing in y-direction.

12. The imaging processing method as in claim 1, wherein said NPCCs are a function of the size and shape of the optical aperture, field of view, spacing of pixels of the detector, size and shape of the photo-sensitive area of each pixels, quantum efficiency of the detector, and wavelength of the incident light. The NPCCs $a_0, a_1, a_2, a_3 \ldots$ can be calculated from PSF, the integration of PSF over the center pixel gives $a_0$; the integration of PSF over one of the first closest neighboring pixel gives $a_1$; the integration of PSF over one of the second closest neighboring pixel gives $a_2$; ... the integration of PSF over one of the pth closest neighboring pixel gives $a_p$; etc.

13. The imaging processing method as in claim 1, wherein said NPCCs can be experimentally determined by measuring light distribution on detector pixels from a point light source.

14. The imaging processing method as in claim 1, wherein said modifying NPOTF with the threshold means if the NPOTF value is smaller than the threshold, then the NPOTF is replaced by the threshold.

15. The imaging processing method as in claim 1, wherein said threshold is a constant.

16. The imaging processing method in claim 1, wherein said threshold is a function of the order of the Fourier transform.

17. The imaging processing method as in claim 1, wherein said Fourier transform is Bessel Fourier transform.

18. The imaging processing method as in claim 1, wherein said Fourier transform is Wavelet transform.

19. The imaging processing method as in claim 1, wherein said adjusting brightness means that the brightness of these monochrome images should be adjusted this way, so that the colors of any bulk areas of the unprocessed image should match the colors for the same bulk area of the processed image.

\* \* \* \* \*